Aug. 2, 1955  H. D. WRIGHT ET AL  2,714,672

ACCELEROMETER

Filed Aug. 30, 1952

INVENTORS.
H. DUDLEY WRIGHT,
ERIC G. LAUE,
BY
Reed C. Lawlor
ATTORNEY.

United States Patent Office 2,714,672
Patented Aug. 2, 1955

2,714,672

ACCELEROMETER

Harry Dudley Wright, Altadena, and Eric G. Laue, San Gabriel, Calif.; said Laue assignor to said Wright Application August 30, 1952, Serial No. 307,314

6 Claims. (Cl. 310—8.4)

This invention relates to improvements in accelerometers and particularly to accelerometers employing as an acceleration responsive element a body of material such as a piezoelectric crystal which possesses an electrical characteristic or condition which varies with the compression thereof.

Accelerometers are employed in the testing and design of aircraft and other machines by mounting the accelerometers securely to the machines in question and then vibrating the machines. It is highly desirable to employ for this purpose an accelerometer which is of light weight and small size. It is also desirable that the accelerometer have a uniform sensitivity over a wide range of frequencies and over a wide temperature range.

Accelerometers have been made from discs of polarized lead-stabilized barium titanate ($BaTiO_3$). Such material is very suitable because the temperature coefficient of its piezoelectric constant is relatively low and its curie point is relatively high. Heretofore, in the construction of accelerometers, discs of that type have been drilled with holes through the centers thereof and the apertured discs have been stacked about a post having stops at opposite ends of the stack and one of the stops has been threadably arranged upon the post in order to adjust the static compression of the discs. This arrangement suffers from the disadvantages that the discs are hard and brittle, thus rendering the manufacture of such accelerometers expensive. Other characteristics desired in an accelerometer are pointed out hereafter.

One of the objects of this invention is to provide an improved accelerometer of low mass, small volume and a minimum number of components.

Another object of this invention is to provide an accelerometer of high resonant frequency and of high uniform sensitivity over a wide frequency range.

Another object of this invention is to provide an accelerometer having a sensitivity and a resonant frequency which are relatively constant over a large temperature range.

Another object of this invention is to provide an accelerometer employing a plurality of discs of electrosensitive material without the necessity of drilling holes through that material.

Another object of this invention is to provide a case that provides the force for compressing the electrosensitive material and for electrostatically shielding the working part of the accelerometer.

The foregoing and other objects of this invention together with various advantages thereof will become apparent from the specification taken in connection with the accompanying drawings. Though this invention is described herein with particular reference to accelerometers, it will be understood that it may also be applied to the measurement of various forces whether they be forces applied between solid objects or pressures produced by fluids, or the like. In this connection it is to be mentioned that acceleration is merely one dynamic manifestation of forces and that, in effect, an accelerometer is a force-measuring instrument, even though it be directly calibrated in acceleration.

Figure 1:
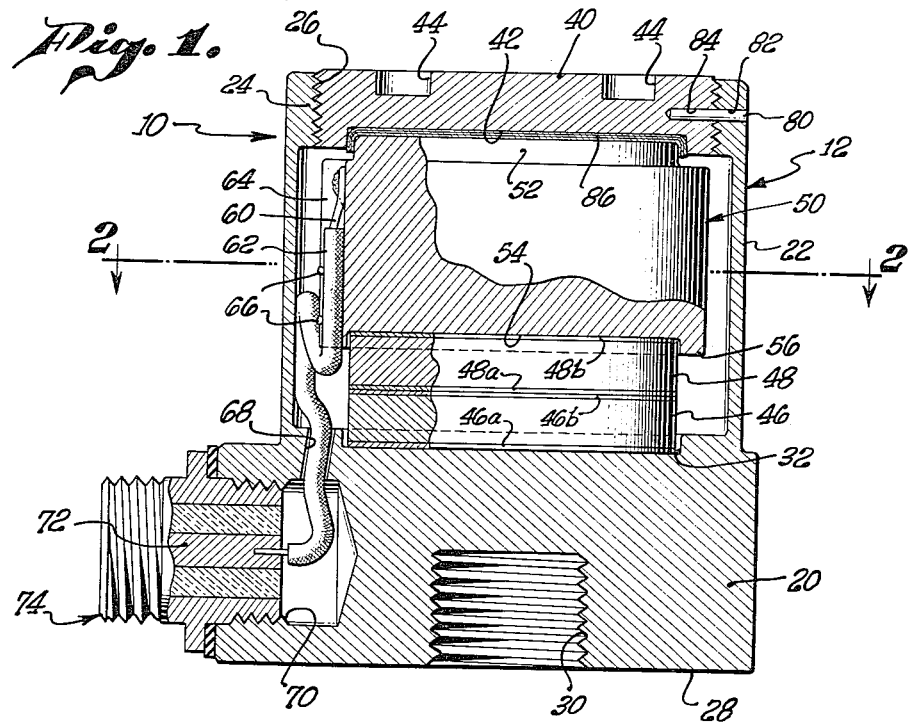
Figure 1 is a longitudinal sectional view of the accelerometer.
Figure 2:
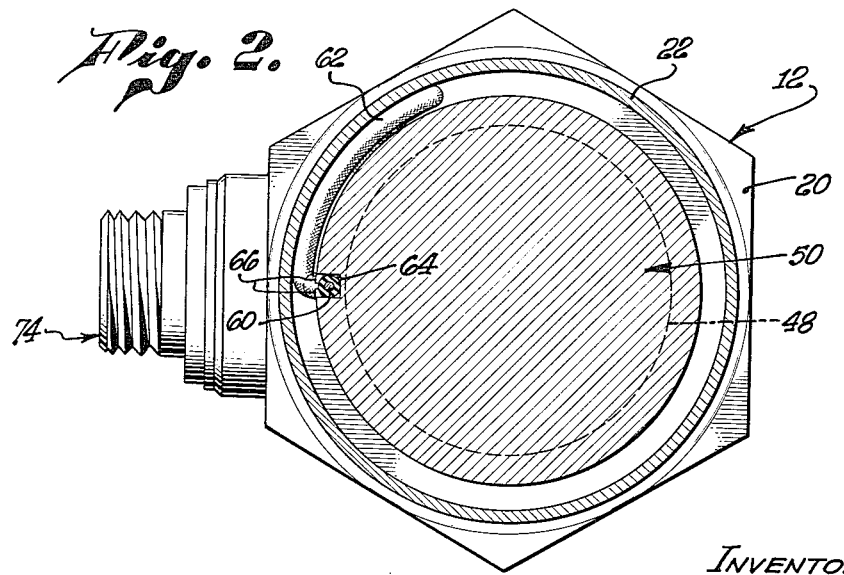
Fig. 2 is a sectional view taken on the plane 2—2 of Fig. 1.

In the drawings, there is illustrated an accelerometer 10 embodying various features of the present invention. The accelerometer comprises a case and a body of electrosensitive material mounted therein. According to the present invention the electrosensitive member is compressed between the end walls of the case, thus causing the cylindrical side wall thereof to be elongated under stress. One end of the case serves as a base and an inertial mass associated with the other end thereof is resiliently supported by the electrosensitive member thereby forming a resonant acceleration-responsive system. The compression of the electrosensitive member and the tension of the tubular member establishes the force constant of the system, thereby establishing both the resonant frequency and the sensitivity.

The case 10 consists of a body member 12 and cap member 40, the two members being hermetically sealed. Since the case is composed of metal, it serves as an electrostatic shield. The body member 12 is of unitary construction comprising a base portion or member 20 and a tubular sidewall portion or member 22. The body member 12 also comprises an inwardly extending threaded lip or flange 24 forming a mouth or opening 26 at the opposite end from the base portion 20. The base portion is formed with an external flat face 28 with a central threaded bore 30. This arrangement facilitates securing the accelerometer firmly to the flat face of a machine to be tested, thus forming, in effect, a rigid part thereof without substantially modifying the resonant characteristics of the accelerating or vibrating object and without substantially affecting the acceleration or vibration thereof.

The base member 20 and the cylindrical member 22 are of circular cross-sectional configuration, being coaxial. The cylindrical member 22 is thin-walled, the thickness thereof being about one or two percent of the diameter of the tubular member and very small compared to the length of the wall lying between the base portion and the threaded flange 24. A circular recess 32 having a diameter less than that of the opening 26 is formed in the base 20 at the lower end of the case 10.

The cap member 40 is cup-shaped, being formed with a circular recess 42 on the interior thereof directly opposite the recess 32 in the base member 20. The two recesses 42 and 32 are of substantially the same diameter and are coaxial with the periphery of the cap member 40. The cap member is formed with two diametrically opposite recesses 44 on the outer side thereof to facilitate rotating with a suitable tool.

The electrosensitive body or member illustrated here comprises a pair of piezo-electric wafers 46 and 48. Material that has been found to be particularly suitable in this invention comprises polarized lead-stabilized barium titanate crystals which are compressed into small flat wafers coated with very thin silver layers 46a, 46b and 48a, 48b at the flat ends thereof. Though one such wafer could be employed in this invention, it is better to employ two, since this minimizes torsional strain in the electrosensitive body by virtue of the fact that the contiguous surfaces of the two wafers are relatively movable while the accelerometer is being assembled.

An inertial member 50 is arranged between the cap member 40 and the pair of wafers 46 and 48. The inertial member 50 is of cylindrical configuration. The upper end of the inertial mass is provided with a circular boss 52 that is of smaller diameter than the recess 42 in the cap member 40. The lower end of the inertial member is provided with a circular recess 54 formed by an axial flange or ring 56.

A conductor 60 having an insulating coating 62 lies in a longitudinal slot 64 formed in the side of the inertial mass 50 and is soldered thereto at one end thereof and is held in place by means of stakes 66. This conductor leads through an inclined opening 68 formed in the base 20 into a radial bore formed in the side of the base where it is fastened to a central conductor 72 of a coaxial connector 74. A retaining pin 80 pressed into registered radial holes 82 and 84 in the case 10 and the cap 40 prevent the cap from rotating in the case.

A disc 86 of kraft paper or other insulating material is cupped in the recess 42 between the cap member 40 and the boss 52.

In order to assemble the accelerometer, the conductor 60 is drawn through the hole 68 and the connector 74 is screwed into the bore 70. The conductor 60 is then drawn through the opening 26 and is laid in the slot 64 formed in the side of the inertial member 50. The bare end of the conductor is then soldered to the inertial mass at the root of the slot 64.

The wafers 46 and 48 are then stacked and placed in the recess 32 in the base member 20. Then with the lower wafer 46 in the recess 32 the inertial mass is inserted in the opening 26 and placed upon the upper wafer 48.

The disc of kraft paper or other insulating material is placed centrally upon the boss 52. The cap member is then screwed into the threaded flange 24 squeezing and cupping the disc of kraft paper and compressing the electrosensitive discs 46 and 48 between the faces of the opposing recesses 32 and 54 in the base member 20 and the inertial member 50.

Initially the inertial member 50 is located on the wafers with the slot 64 in a counter-clockwise position relative to the hole 68. This permits the inertial member 50 to turn slightly without applying tension to the conductor 60 as the cap member 40 is rotated in a counter-crosswise direction.

As the cap member rotates the cylindrical member 22 is stretched or elongated, producing a longitudinal or axially extending tension therein. This tension, acting through the cap member 40 compresses the discs 46 and 48. In practice the compliance of the cylindrical member 22 is very large compared to the compliance of the two wafers 46 and 48. Expressed differently, the force constant of the cylindrical member 22 is very small compared with the force constant of the two wafers 46 and 48. For this reason, as the cap member 40 is rotated, the cylindrical member 22 is elongated a great deal more than the discs 46 and 48 are shortened.

As mentioned above, the inertial member 50 and the two wafers 46 and 48 form a resonant mechanical system. In this system the wafers 46 and 48 serve as a resilient member interconnecting the inertial member 50 and the base 20. Inasmuch as the force constant of the wafers 46 and 48 is much greater than that of the cylindrical member 22, that force constant is primarily responsible for resisting the movement of the inertial member 50 when the accelerometer as a whole is subjected to accelerating forces applied to the base member 20.

When an acceleration force is applied to the base member 20, the spacing between the inertial member 50 and the base member changes, changing the degree of compression of the wafers 46 and 48. Such a change in compression causes a corresponding change in the electrical condition of the crystals of the wafers generating an electromotive force between the base member 20 and the inertial member 50. This force is detected by means of conventional equipment including a cable connected to the connector 74. In practice, the electromotive force generated by the wafers 46 and 48 does not bear a constant relationship with the accelerational force applied to the base member but varies with frequency. However, it is substantially proportional to acceleration at any one frequency. Generally speaking, certain resonant frequencies appear in the response characteristic, and over a wide range below the lowest resonant frequency the response is substantially uniform.

In practice it has been found that the sensitivity of the accelerometer increases with the tension in the cylindrical member 22. It has also been found that the resonant frequency of the mechanical system formed by the wafers and the inertial member increases with such tension.

In this accelerometer the lowest resonant frequency that appears depends upon the length of the cylindrical member 22. Thus, in order to achieve uniform response over a wide frequency range, the length of the cylindrical 22 is made short and the wafers 46 and 48 are compressed to such an extent that the resonant frequency of the mechanical system formed by the wafers and the inertial member is very high. To take full advantage of the construction, this resonant frequency is much higher than the longitudinal resonant frequency of the cylinder.

During assembly the cap member 40 is rotated an amount to cause this mechanical system to have such a high resonant frequency and the amount of compression of the wafers 46 and 48 is chosen to produce a predetermined high sensitivity at low frequencies. When the desired resonant frequency and sensitivity have been achieved, holes 82 and 84 are drilled and the retaining pin 80 is pressed into them.

As mentioned hereinabove, the wafers are composed of barium titanate. The inertial member is made of Monel metal; the case, including both the body thereof and the cap member, is composed of stainless steel. These materials have characteristics indicated in the following table:

| Material | $K_T$ | $p$ | $Y$, dynes/cm.² |
|---|---|---|---|
| BaTiO₃ | $19.10^{-6}$ | 5.6 | *$8.9.10^{11}$. |
| Monel metal | $16.10^{-6}$ | 8.8 | $17.10^{11}$. |
| Stainless Steel | $19.5.10^{-6}$ | 7.8 | $19.10^{11}$. |

*Approximately.

where:

$K_T$ = linear temperature coefficient of expansion.
$p$ = density.
$Y$ = Young's modulus.

It will be noted that the temperature coefficient of expansion of the wafers, the inertial member and the case are very nearly equal. Consequently, as the temperature changes, the degree of compression of the wafers 46 and 48 compared with the normal size at the temperature thereof, does not vary substantially, so that the sensitivity is substantially independent of temperature.

It will also be noted that the density of the inertial member and the case are both higher than that of the wafers, thus aiding in creating large inertial forces to compress the wafers. These large inertial forces are also produced in part by employing an inertial member that is much thicker than the wafers.

It will also be noted that the value of Young's modulus for the inertial member is much higher than that for the wafers. Accordingly, since forces are applied by the case over equal areas of the inertial member and the wafers, a large portion of the compressive force supplied by the case is accommodated by compression of the wafers.

In practice, the wafers have a diameter less than 0.375 inch and a thickness of about 0.06 inch. The kraft disc is about 0.003 inch thick. It is partly because of its very low thickness that the kraft disc does not appreciably effect the force constant. Also in practice, the length of the inertial mass is less than 0.25 inch and its diameter is less than 0.5 inch. It is thus seen that the accelerometer so produced is compact and of light weight.

From the foregoing description it is apparent that an accelerometer has been provided which achieves the objects of this invention. Although only one particular form of the invention has been specifically disclosed, it will be obvious that the invention is not limited thereto but is capable of a variety of mechanical embodiments. Various changes which will now suggest themselves to those skilled in the art may be made in the material, form, details of construction and arrangement of the elements without departing from the spirit of the invention. Reference is therefore to be had to the appended claims to ascertain the scope of the invention.

The invention claimed is:

1. A measuring instrument comprising: a case having a compliant cylindrical sidewall and having a stiff base member and a stiff cap member at opposite ends thereof, said base member having a recess in the inner wall thereof; a body of electrosensitive material compressed between said base member and said cap member by tension of said cylindrical member, said body of material having an electrical characteristic which varies in accordance with the compression thereof; an inertial member coupled to said cap member for varying the compression of said body in response to acceleration of said base member; and means including a pair of conductors connected to mutually spaced points of said body of material for detecting changes in such electrical characteristic.

2. A measuring instrument comprising: a case having a compliant cylindrical sidewall and having a stiff base member and a stiff cap member at opposite ends thereof, said base member having a recess in the inner wall thereof; an inertial member secured to said cap member, said inertial member having a recess opposite the recess in said base member; two cylindrical wafers stacked between the faces of the recesses of said inertial member and said base member and compressed therebetween by tension of said cylindrical member, said wafers being composed of material having an electrical characteristic that varies in accordance with the compression thereof; and means including a pair of mutually insulated conductors electrically connected to the remote faces of said wafers for detecting changes in such electrical characteristic.

3. A measuring instrument comprising: a case having a compliant cylindrical sidewall and having a stiff electrically conductive base member and a stiff cap member at opposite ends thereof, said base member having a recess in the inner wall thereof; an electrically conductive inertial member secured to but insulated from said cap member, said member having a recess opposite the recess in said base member; two cylindrical wafers stacked between the faces of the recesses of said inertial member and said base member and compressed therebetween by tension of said cylindrical member, said wafers being composed of material having an electrical characteristic that varies in accordance with the compression thereof; and means including a pair of conductors connected respectively to the base and to the inertial member for detecting changes in such electrical characteristic.

4. A measuring instrument comprising: a case composed of electrically conductive material having a compliant cylindrical sidewall and having a stiff base member and a stiff cap member at opposite ends thereof, said base and cap members having recesses in the inner wall thereof; an electrically conductive inertial member having a boss fitted into the recess in said cap member, said inertial member having a recess opposite the recess in said base member; an insulating sheet cupped between said inertial member and said cap member; two cylindrical wafers stacked between the faces of the recesses of said inertial member and said base member and compressed therebetween by tension of said cylindrical member, said disks being composed of material having an electrical characteristic that varies in accordance with the compression thereof, and means including a pair of conductors connected electrically to the remote faces of said wafers for detecting changes in such electrical characteristic.

5. A measuring instrument comprising: a case having a compliant cylindrical sidewall portion and having a stiff base at one end thereof, said sidewall member having a threaded inwardly extending flange at the opposite end thereof; a stiff cap member threadably engaging said flange and rotatable relative thereto, said base and cap members having opposing recesses in the inner walls thereof said recesses being coaxial with the periphery of said cap member; an inertial member having a boss fitted into the recess in said cap member, said massive body having a recess opposite the recess in said base member; a cylindrical body resting between the faces of the recesses of said massive body and said base and compressed therebetween by tension of said cylindrical portion, the tension being adjustable by rotation of said cap member, said cylindrical body being composed of material having an electrical characteristic that varies in accordance with the compression thereof; and means including a pair of conductors connected to mutually spaced points of said body of material for detecting changes in such electrical characteristic.

6. A measuring instrument comprising: a case having a compliant cylindrical sidewall portion and having a stiff base at one end thereof, said sidewall portion having a threaded inwardly extending flange at the opposite end thereof; a stiff cap member threadably engaging said flange and rotatable relative thereto, said base and cap members having opposing recesses in the inner walls thereof, said recesses being coaxial with the periphery of said cap member; an inertial member having a boss fitted into the recess in said cap member, said massive body having a recess opposite the recess in said base member; two cylindrical wafers stacked between the faces of the recesses of said massive body and said base and compressed therebetween by tension of said cylindrical portion, the tension being adjustable by rotation of said cap member, said disks being composed of material having an electrical characteristic that varies in accordance with the compression thereof; and means including a pair of mutually insulated conductors connected electrically to the remote faces of such wafers for detecting changes in such electrical characteristic.

References Cited in the file of this patent

UNITED STATES PATENTS

| | | |
|---|---|---|
| 2,411,401 | Welch | Nov. 19, 1946 |
| 2,514,297 | Smith | July 4, 1950 |